March 26, 1935.  W. W. MOHR  1,995,395
BONNET CONSTRUCTION FOR VALVES
Filed Nov. 19, 1932
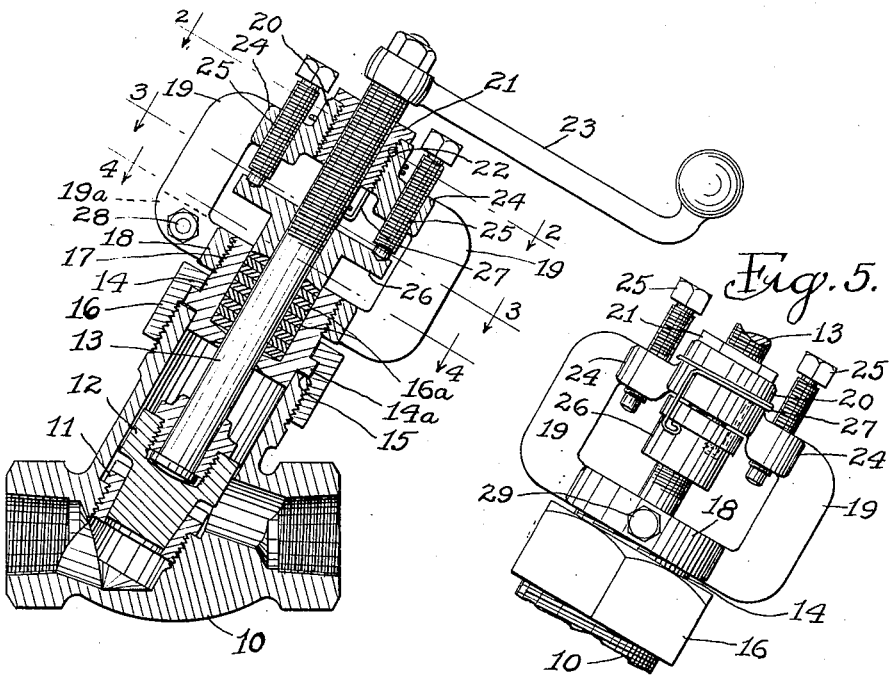
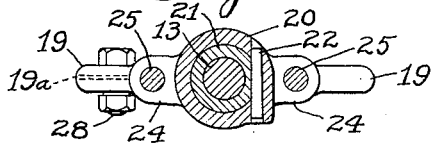
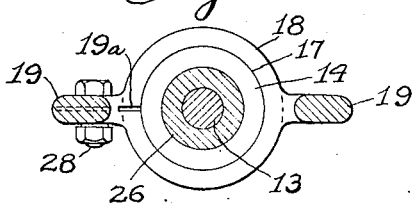
INVENTOR.
WALTER W. MOHR
BY Albert C. Bill
ATTORNEY.

Patented Mar. 26, 1935

1,995,395

UNITED STATES PATENT OFFICE 1,995,395

BONNET CONSTRUCTION FOR VALVES

Walter W. Mohr, Chicago, Ill., assignor, by mesne assignments, to Crawford Valve & Manufacturing Company, East Chicago, Ind., a corporation of Indiana Application November 19, 1932, Serial No. 643,369

3 Claims. (Cl. 251—50)

My invention relates to an improved bonnet construction for valves, and particularly for valves intended for use with high pressures and temperatures, for example, valves for controlling steam pressures of one thousand pounds per square inch or more.

In connection with steam pressures of the kind referred to, the temperatures are of course correspondingly high, and much difficulty has been experienced in the past with bonnet constructions of the usual type, in repacking the valve stem at the gland of the valve. Usually the clearances provided are small and it is difficult if not impossible to repack the stem without seriously burning the workman.

By my present invention, I provide a construction of bonnet by which large clearances are produced, together with facilities for holding the gland in its extreme outer position during a packing operation, so that the liability of burning the workman is reduced to a minimum. To produce a practical construction of this kind, I prefer to construct the bonnet of several parts which are preferably threaded one on the other to produce the complete structure, since the part of the bonnet containing the stem packing, is preferably made of special alloy, for example a suitable steel alloy, to withstand the high temperatures and the action of the high pressure fluid controlled by the valve, which alloy would make the complete bonnet construction unduly expensive if it were used in making an integral bonnet structure in accordance with my invention.

My invention will best be understood by reference to the accompanying drawing illustrating a preferred embodiment thereof, in which Fig. 1 illustrates in vertical, central, sectional view, a valve construction provided with my improved bonnet construction, Fig. 2 is a transverse sectional view through the parts shown in Fig. 1, taken along the line 2—2, Fig. 3 is a transverse sectional view through the parts shown in Fig. 1, taken along the line 3—3, Fig. 4 is a transverse sectional view through the parts shown in Fig. 1, taken along the line 4—4, and Fig. 5 shows in side elevation the bonnet construction illustrated in Fig. 1, with the gland in its outermost position, the only difference being that in Fig. 5, I illustrate a different form of retaining means for holding the yoke portion of the bonnet on its stub portion containing the stem packing.

Similar numerals refer to similar parts throughout the several views.

As shown in Fig. 1, a valve body or casing is illustrated at 10, which is preferably of the forged steel type, with the passageways through it to provide for fluid flow and to receive the valve seat and valve member, drilled out to proper size. The casing contains a valve seat 11 for engagement by a valve member 12 carried by the lower end of a valve stem 13 in a manner usual in the art, to permit free angular movement of the stem relatively to the valve member 12, and yet at the same time to move said valve member in either direction longitudinally with the valve stem 13. The upper end of the casing 10 receives the lower end of a bonnet stub 14, having a flange 14a between which and the end of the casing 10, a gasket 15 is disposed. A union nut 16 threaded on the upper end of the casing 10, engages the flange 14a to hold the bonnet stub 14 tightly against the gasket 15. The stem 13 passes through the lower end of the bonnet stub 14 with a close fit and the upper part of the bonnet stub is counterbored to receive the stem packing 16a. The upper end of the bonnet stub 14 is externally threaded at 17 to engage corresponding internal threads of a ring 18 from which the opposite members 19, 19 of the yoke portion of the bonnet extend upwardly, said yoke members being integral with the ring 18. The upper ends of the yoke members 19, 19 are integral with a ring 20 which is internally threaded to engage the corresponding external threads of a bushing 21, which bushing is internally threaded to engage corresponding threads on the upper end of the valve stem 13. The bushing 21 is retained in position in the ring 20 in any suitable manner, for example by a locking pin 22. By this construction, the bushing 21 may be made of metal or alloy that is best suited to engage the threads on the valve stem and that will best stand the wear incident to operating the valve stem. If preferred, the bushing may be omitted and the threads engaging the valve stem may be made in the ring 20. The outer end of the valve stem has secured to it, an operating handle 23 by rotation of which the stem may be rotated to operate the valve member 12.

Adjacent the ring 20, the upper ends of the yoke members 19 of the bonnet, have bosses 24 formed on them through which threaded bores are formed parallel with the axis of the stem 13, to receive screws 25, 25, the lower ends of which are of somewhat reduced diameter and engage corresponding seats in the arms of a gland 26 for holding the packing 16a in place, so that the packing may be compressed as tightly as desired by turning the screws 25, 25 downwardly.

The bosses 24, 24 are spaced from the valve stem at their lower portions, sufficiently to receive between them, the gland 26, when said gland is released by the clamping screws 25, 25 and turned substantially 90°, so that its narrowest dimension is in line with said bosses, to permit the gland to be moved as far as possible from the stub portion of the bonnet, as illustrated in Fig. 5. The gland may be held temporarily in that position, by a spring 27 which for convenience may encircle the ring 20 and may be provided with downwardly extending ends engaging the shoulder below the arms of the gland 26, so that there is no danger of the gland slipping downwardly during a repacking operation.

In the construction illustrated in Fig. 1, one of the yoke members 19 is slotted at its lower portion as indicated at 19a, which slot extends through the ring 18, a clamping screw or bolt 28 being provided through the slotted portion, to clamp the ring 18 tightly upon the upper end of the stub portion 14 of the bonnet, after the parts have been screwed together, so that there will be no turning movement of the yoke portion of the bonnet relatively to its stub, when the valve is in use.

In Fig. 5, I illustrate a modified form of clamping means for securing the yoke portion of the bonnet to its stub portion, consisting of a set screw 29 carried by the ring 18 for engaging the upper end of the stub portion 14 of the bonnet, when the bonnet parts are screwed together. It will be understood that any equivalent clamping means may be employed, as desired.

The packing 16a may be of any desired kind, for example split rings with staggered joints to prevent leakage, or where the threads between the portions of the bonnet are of the same pitch as the threads on the valve stem, closed ring packing may be employed, by removing the handle 23 from the valve stem, and then releasing the bonnet clamping means and turning the yoke portion of the bonnet on its stub portion, so that all of the parts of the bonnet structure above its stub portion, may be removed, and closed ring packing may be slipped over the valve stem and put in place in the said stub portion.

With the construction described, it is practicable to provide ample clearances around the valve stem and between the yoke members of the bonnet, and between the stub portion 14 of the bonnet and the gland 26 with said gland in its outer most position, so that a workman may renew the stem packing without danger of being burned. By making the bonnet in two portions, the stub portion 14 may be made of the best and highest grade alloy which is available for the purpose, which alloy is usually relatively expensive, without imparting a prohibitive cost to the bonnet construction as a whole, since the ring 18, the yoke members 19 and the parts carried by the outer ends of the yoke members, may be of relatively inexpensive metal, the only requirement in connection with these parts of the bonnet structure, being that they shall have the requisite strength to accomplish their intended purposes, since they are substantially spaced from the zone of highest temperature. The yoke members 19, 19 are preferably flat and of substantial widths relatively to their thickness, which not only affords a maximum clearance space around the valve stem for repacking purposes, but at the same time affords substantial heat radiating surfaces maintaining the stem packing substantially cooler than if said radiating surfaces were not employed.

While I have shown my invention in the particular embodiment above described, it will be understood that I do not limit myself to this exact construction as I may employ equivalents known to the art at the time of the filing of this application without departing from the scope of the appended claims.

What I claim is:

1. Gland holding means for valve constructions comprising the combination of a casing, a threaded valve stem, a bonnet having a yoke portion extending from said casing and a threaded member in threaded engagement with said stem, a movable gland for engaging packing in said casing around said stem, and a spring carried by and retained on said yoke for yieldably and releasably engaging said gland in a position remote from said packing to facilitate repacking said stem.

2. Gland holding means for valve constructions comprising the combination of a casing, a threaded valve stem, a bonnet having a yoke portion extending from said casing and a threaded member in threaded engagement with said stem, a movable gland for engaging packing in said casing around said stem, and a spring carried by and retained on said yoke for yieldably and releasably engaging said gland in a position remote from said packing to facilitate repacking said stem, said spring having hooked end portions for engaging said gland.

3. Gland holding means for valve constructions comprising the combination of a casing, a threaded valve stem, a bonnet having a yoke portion extending from said casing and a threaded member in threaded engagement with said stem, a movable gland for engaging packing in said casing around said stem, and a spring member completely encircling said yoke threaded member and having axially extending end portions for yieldably and releasably engaging and holding said gland in a position remote from said packing.

WALTER W. MOHR.